D. PETRI-PALMEDO.
BOTTOM TRIMMING KNIFE WIPER.
APPLICATION FILED DEC. 13, 1912.
1,108,391.
Patented Aug. 25, 1914.
2 SHEETS—SHEET 1.
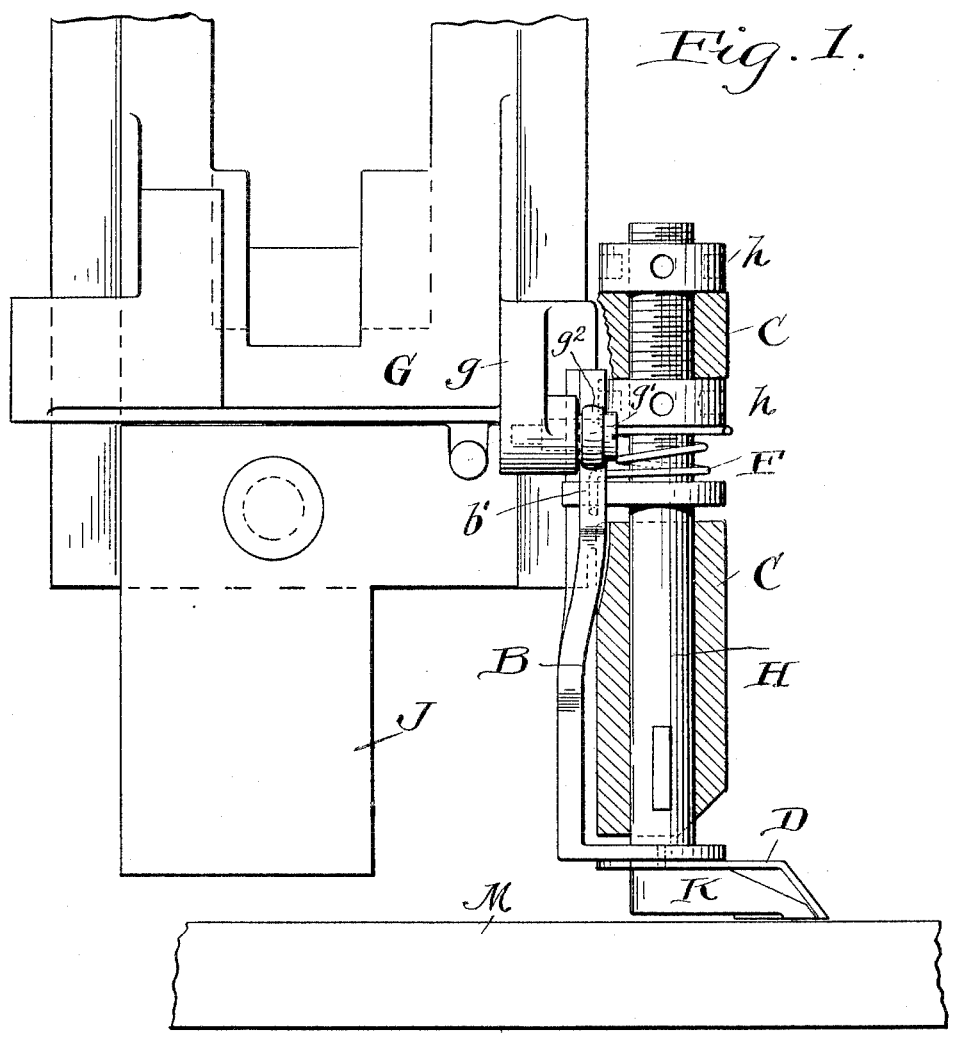
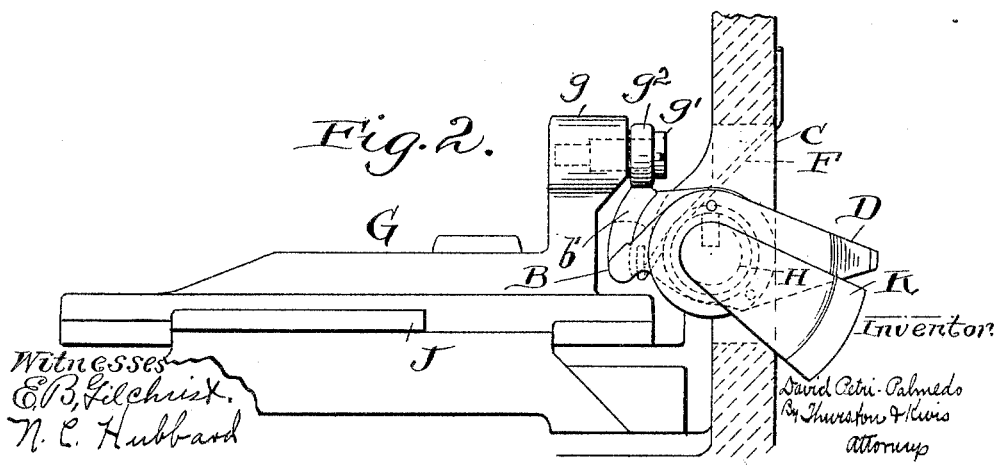

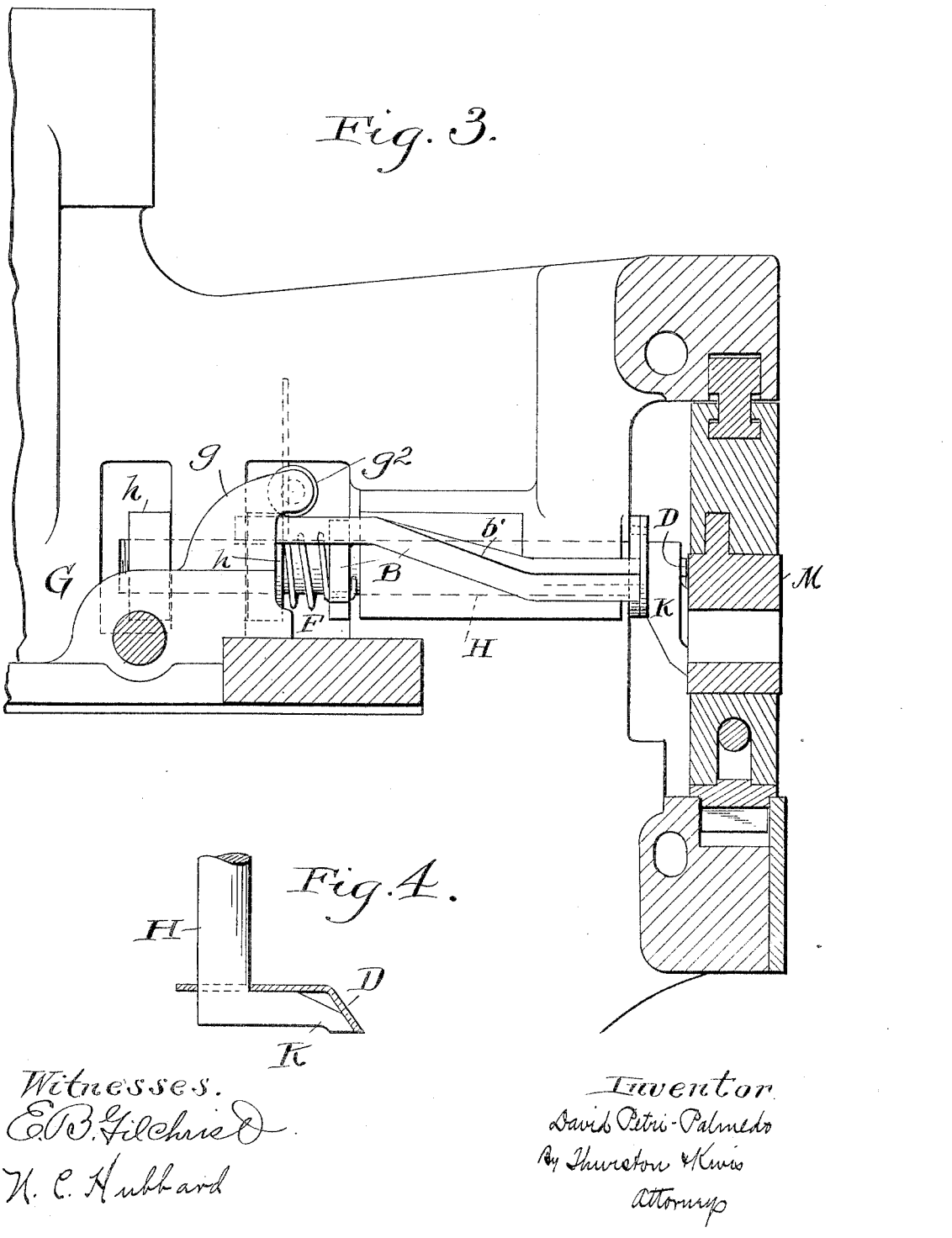

UNITED STATES PATENT OFFICE.

DAVID PETRI-PALMEDO, OF BRIDGEPORT, CONNECTICUT, ASSIGNOR TO ELECTRIC COMPOSITOR COMPANY, OF NEW YORK, N. Y., A CORPORATION OF NEW JERSEY.

BOTTOM-TRIMMING-KNIFE WIPER.

1,108,391.　　　　Specification of Letters Patent.　　Patented Aug. 25, 1914.

Application filed December 13, 1912. Serial No. 736,578.

*To all whom it may concern:*

Be it known that I, DAVID PETRI-PALMEDO, a citizen of the United States, residing at Bridgeport, in the county of Fairfield and State of Connecticut, have invented a certain new and useful Improvement in Bottom-Trimming-Knife Wipers, of which the following is a full, clear, and exact description.

In line casting machines the mold in moving from the casing to the slug ejecting position passes a bottom trimming knife, that is to say, a fixed knife which engages the pot-side face of the mold and extends across the mold slot so that, as the mold moves in the direction stated, this knife will shave off the sprue from the bottom of the newly cast slug close to the mold, thereby making the slug accurately type high.

Experience has shown that while bottom trimming knives clean the pot-side face of the mold while the mold is moving to the slug ejecting position, the shavings from the slug frequently cling to the knife so that, when the mold again moves toward the casting position, it may wipe the shavings from the knife and carry them along adhering to its face,—that is, the face of the mold. If such shavings do cling to and find lodgment on the pot-side face of the mold they will prevent the tight locking of the pot nozzle against the mold during the next casting operation.

The object of this invention is to prevent this, and it accomplishes this result by wiping the shavings from the bottom trimming knife while the mold is in the ejecting position.

The invention consists in the construction and combination of parts which are shown in the drawing and hereinafter described and definitely pointed out in the claims.

In the drawing, Figure 1 is a plan view partly in section of mechanism embodying the invention. Fig. 2 is a front elevation of said mechanism. Fig. 3 is a side elevation of the mechanism embodying the present invention shown in its relation to the mold, which latter is shown in section. Fig. 4 is a detached plan view of the knife and the front end of the shank and a sectional view of the associated knife wiper.

In the drawing, M represents the mold which may be of any suitable construction, as, for example, such as is shown and described in Patent No. 1,027,551. That is to say, it is a mold which moves in a horizontal path between the casting and ejecting positions. The bottom trimming knife K has its cutting edge formed on the arc of a circle which is concentric with a cylindrical stud or shank H, to the front end of which the knife is fixed. This shank is non-rotatably mounted in suitably fixed brackets C, C; and is adjustable lengthwise therein by means of nuts $h$, so that said knife will properly engage with the pot-side face of the mold. A rocking frame B is mounted on this shank H, so that it may turn thereon and may also have slight endwise movement thereon. The knife wiper D is fixed to the front end of this rocking frame. It is a small brass finger so shaped that it will engage the beveled rear face of the knife edge. A coiled spring F surrounds shank H and engages with this frame and acts to turn the frame in the knife wiping direction and also acts, while it is so turning this frame, to move the frame lengthwise of the stud so as to insure close contact of the wiper with the knife. In order to move this knife wiper frame in the contrary direction, use is made of the ejector slide G which is a necessary part of the machine. This slide moves horizontally backward and forward and carries an ejector blade J which, during the forward movement of the slide, engages the slug in the mold and pushes it out,—after which the slide moves rearward. It is therefore obvious that both the forward and backward movement of the ejector slide must take place while the mold is in the mold ejecting position,—that is to say, after the bottom trimming knife has trimmed the bottom of the slug. This ejector slide G carries close to its right edge a post $g$, from which a stud $g^1$ projects laterally; and on this stud is mounted a roller $g^2$. On the rocking frame B is a cam surface $b^1$ arranged to be engaged by this roller, said surface being inclined downward from rear to front. The spring F so turns the rocking frame as to hold this cam surface in engagement with the roller. Now, when the ejector slide moves forward on its slug ejecting journey, it allows this spring to turn the rocking frame in the knife wiping direction, and also allows the spring to move the frame forward so that the knife wiper will, as the frame is turned by the spring, closely hug the knife edge. When, however, the slide moves rearward, this roller, by engaging the cam surface, will rock the wiper frame so as to carry it back to its original position. The engagement of the roller with the cam surface $b^1$ which, as stated, inclines upward from front to rear, also causes a slight rearward movement of the rocking frame, which results in the substantial disengagement of the wiper from the knife edge during this cam-induced rocking movement of the wiper frame back to its normal position. The disengagement of the wiper from the knife by this slight rearward movement of the wiper frame, will generally insure that in its return movement the wiper will not redeposit the shavings onto the knife blade. Such action is, however, additionally provided for by so shaping and proportioning the parts shown that the knife wiper will have a throw or movement through a greater arc than the arc of the knife edge. That is to say, the wiper will swing past and out of engagement with the knife at both ends of its path. If any chips or shavings have adhered to the wiper, they will likely drop off of the same after it has moved out of engagement with the knife.

Having described my invention, I claim:

1. In a line casting machine, the combination with the movable mold, and a bottom trimming knife which engages the pot-side face of the mold and has its cutting edge in the form of the arc of a circle, with a knife wiper frame which is mounted to rock about an axis which is coincident with the center of the knife edge arc, a knife wiper secured to said frame for engagement with the knife edge, and means for rocking said frame from and then back to its normal position while the mold is in the slug-ejecting position.

2. In a line casting machine, the combination with the movable mold, and a bottom trimming knife which engages the pot-side face of the mold and has its cutting edge in the form of the arc of a circle, with a knife wiper frame which is mounted to rock about an axis which is coincident with the center of the knife edge arc, a knife wiper secured to said frame for engagement with the knife edge,—the throw of the said wiper frame being such as to carry the wiper beyond and out of engagement with the knife edge at both ends thereof.

3. In a line casting machine, the combination with the movable mold, and a bottom trimming knife which engages the pot-side face of the mold and has its cutting edge in the form of the arc of a circle, with a knife wiper frame which is mounted to rock about an axis which is coincident with the center of the knife edge arc, and is also capable of endwise movement, a wiper finger secured to said frame for engagement with said knife edge, a spring acting on said frame to turn it in the knife wiping direction and to simultaneously move it endwise to cause the wiper to engage said knife edge, and means for turning said frame in the opposite direction to carry it back to its normal position.

4. In a line casting machine, the combination with a movable mold, and a bottom trimming knife which engages the pot-side face of the mold and has its cutting edge in the form of the arc of a circle, a cylindrical non-rotatable shank to which the knife is attached, which shank is concentric with the circle of which the knife edge is an arc, a wiper frame mounted upon said shank so as to be capable of turning and moving endwise thereon, a spring acting on said frame and tending to turn it in one direction and to move it forward, a knife wiper fixed to said frame and adapted by the forward movement thereof to closely contact with the knife edge, and means for swinging said frame in the opposite direction back to its normal position.

5. In a line casting machine, the combination with a movable mold, and a bottom trimming knife which engages the pot-side face of the mold and has its cutting edge in the form of the arc of a circle, a cylindrical non-rotatable shank to which the knife is attached, which shank is concentric with the circle of which the knife edge is an arc, a wiper frame which is mounted upon said shank and is capable of turning and of moving endwise thereon and is provided with a cam surface, a spring acting upon said wiper frame to turn it in one direction and to move it endwise forward, and a slide movable in a path at right angles to the path of the mold, and a roller carried by said frame and engaging with said cam surface.

In testimony whereof I hereunto affix my signature in the presence of two witnesses.

DAVID PETRI-PALMEDO.

Witnesses:
 EDWARD F. GODDARD,
 F. P. STILLMAN.

---

Copies of this patent may be obtained for five cents each, by addressing the "Commissioner of Patents, Washington, D. C."